(12) United States Patent
Yoshida

(10) Patent No.: US 7,165,254 B2
(45) Date of Patent: Jan. 16, 2007

(54) THREAD SWITCH UPON SPIN LOOP DETECTION BY THRESHOLD COUNT OF SPIN LOCK READING LOAD INSTRUCTION

(75) Inventor: Toshio Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 147 days.

(21) Appl. No.: 10/990,385

(22) Filed: Nov. 18, 2004

(65) Prior Publication Data

US 2006/0026411 A1 Feb. 2, 2006

(30) Foreign Application Priority Data

Jul. 29, 2004 (JP) ............... 2004-222043

(51) Int. Cl.
*G06F 9/50* (2006.01)

(52) U.S. Cl. ............ 718/102; 712/241; 718/104; 718/108

(58) Field of Classification Search ............ None
See application file for complete search history.

(56) References Cited

U.S. PATENT DOCUMENTS

| | | | | |
|---|---|---|---|---|
| 4,979,105 A | * | 12/1990 | Daly et al. ............ | 714/10 |
| 5,335,330 A | * | 8/1994 | Inoue ............ | 712/241 |
| 5,740,410 A | * | 4/1998 | McDermott ............ | 713/501 |
| 5,887,178 A | * | 3/1999 | Tsujimoto et al. ............ | 713/322 |
| 6,018,759 A | * | 1/2000 | Doing et al. ............ | 718/108 |
| 6,678,638 B1 | | 1/2004 | Takamura ............ | 702/186 |
| 2004/0215939 A1 | * | 10/2004 | Armstrong et al. ............ | 712/220 |
| 2005/0246506 A1 | * | 11/2005 | Ukai ............ | 711/152 |

FOREIGN PATENT DOCUMENTS

| | | |
|---|---|---|
| JP | 2002-163121 | 6/2002 |
| JP | 2002-278752 | 9/2002 |
| JP | 5-12010 | 1/2003 |

* cited by examiner

*Primary Examiner*—Kenneth S. Kim
(74) *Attorney, Agent, or Firm*—Staas & Halsey LLP

(57) ABSTRACT

The present invention relates to a processor system. The processor system is made up of a multithread control unit for selectively making switching among said threads to be executed in an arithmetic unit, a loop predicting unit for predicting a loop of an instruction string on the basis of a processing history of a branch instruction in the thread, and a loop detecting unit for, when the loop predicting unit predicts the loop, detecting the loop on the basis of an instruction. When the loop detecting unit detects the loop, the multithread control unit making the switching from the thread, which is in execution in the arithmetic unit, to a different thread. This prevents a wait condition stemming from the loop from interfering with the execution of other threads without retouching software.

31 Claims, 19 Drawing Sheets

FIG. 16

| A | A | A | A | B | A |
|---|---|---|---|---|---|
| A | B | B | A | B | A |
| A | A | A | B | B | A |
| A | B | B | B | A | A |
| B | B | A | B | A | B |

• SMT (SIMULTANEOUS MULTITHREADING)

THREAD SWITCH UPON SPIN LOOP DETECTION BY THRESHOLD COUNT OF SPIN LOCK READING LOAD INSTRUCTION

BACKGROUND OF THE INVENTION (1) Field of the Invention

The present invention relates to thread switching control in a processor system.

(2) Description of the Related Art

In the recent years, as the representatives of computer architectures, in addition to a CISC (Complex Instruction Set Computer) architecture designed to carry out complex processing in accordance with one instruction, there have been known an RISC (Reduced Instruction Set Computer) architecture made to simplify processing to be implemented relative to one instruction, a VLIW (Very Long Instruction Word) made to collect a plurality of simultaneously processible instructions into one long instruction through software, and other architectures.

In addition, the processing methods in a central processing unit (CPU) of a computer for realizing these architectures are roughly classified into two: in-order execution type and out-of-order execution type.

FIG. 13 is an illustration for explaining an in-order execution type processing method, while FIG. 14 is an illustration for explaining an out-of-order execution type processing method. As shown in FIG. 13, the in-order execution type is a method of conducting instruction processing according to a program, and as shown in FIG. 14, the out-of-order execution type is a method of seeing the dependence (dependent relationship) between instructions so that, in the case of an instruction having no dependence, the processing is conducted without following the program sequence.

Furthermore, in the recent years, in addition to single thread processing for carrying out one program (thread) in one processor, attention has been paid to a multithread processor system designed to physically carry out a plurality of threads in parallel in one processor.

FIGS. 15A and 15B are illustrations for explaining a multithread processor system. FIG. 15A is an illustration for explaining single thread processing, while FIG. 15B is an illustration for explaining multithread processing. FIG. 15B shows an example of multithread processing in which two programs A and B are processed in parallel in one CPU.

In general, in addition to a register visible to software and a status register (CPU status register), a CPU has resources for carrying out the addition, subtraction, multiplication, division, load processing for reading out memory data into a register and software processing for writing register data in a memory. The multithread processor is designed to multiplex registers visible to software in one CPU so that a plurality of programs share an instruction execution resource for addition/subtraction or the like while implementing separate programs.

As a method of realizing the above-mentioned multithread processing, in addition to a fine grained multithreading method or simultaneous multithreading (SMT) method (see FIG. 16) which carries out a plurality of threads simultaneously, there has been known a coarse grained multithreading method or vertical multithreading (VMT) method (see FIG. 17) which is designed to make the switching to a different thread and implement it in the case of the occurrence of an event such as a cache miss without carrying out a plurality of threads simultaneously (for example, see Japanese Patent Application Laid-Open No. 2002-163121).

FIG. 16 is an illustration for explaining the SMT method, while FIG. 17 is an illustration for explaining the VMT method.

The VMT method is for covering up the cache-miss instruction processing which requires a long time, and it is designed to, in the case of the detection of cache miss, make the switching to a different thread and carry out the thread in an execution unit or control unit (both are not shown) with respect to the processing other than a memory access while a cache control unit (not shown) conducts the processing to bring data from a memory to a cache. Moreover, in this VMT method, with respect to threads in which cache miss is hard to develop, the switching to a different thread is made when a given period of time elapses.

Meanwhile, for example, in a program to be executed by a multiprocessor, for the purpose of synchronizing the processing among the processors, there can be included a code called a spin-loop for continuously monitoring the data (share data, monitor data) in a specified area on a memory until monitor data is changed to an expected value by a different processor.

FIG. 18 is an illustration for explaining the spin-loop. In the example shown in FIG. 18, in a multiprocessor including two processors CPU 0 and CPU 1, the spin-loop is implemented in order to establish the synchronization with the CPU 1 in the CPU 0. In this spin-loop condition, although instruction processing is conducted at all times in terms of hardware, as shown in FIG. 18, a wait (synchronization wait) condition in which processing does not advance is taken in terms of program.

FIG. 19 is an illustration of a spin-loop condition in a multithread processor. In the example shown in FIG. 19, in a multithread processor designed to carry out two threads 0 and 1 in parallel, the thread 0 implements the spin-loop for establishing the synchronization with the thread 1.

In the spin-loop, until the data on a memory is changed, a processor which does not carry out the multithread processing does nothing except continuously monitoring monitor data. On the other hand, a multithread processor designed to implement the multithread processing is required to conduct other thread processing.

In the monitor processing on a memory (monitor data), since a cache miss does not occur usually, in the multithread processor, once the memory monitor starts, not until a given period of time elapses, the thread switching takes place. The processing which does not advance (meaningless) continues for the meantime. When a great deal of processor processing time is spared for such meaningless processing, the performance of the processor degrades and the completion of the synchronization between the threads delays. That is, the wait condition in the spin-loop interferes with the other thread processing.

So far, for enhancing the processing efficiency in the multithread processor, there has been known a new-program-code employing method, such as tuning, in which, for giving an instruction to the processor as to that the thread (program) is in a wait condition and the priority is placed on the execution of the other thread, for example, an instruction (program code) for lowering the priority of the thread which is presently in execution is added to an instruction set and an instruction is newly inserted into a portion of the thread which is in a wait condition.

However, although this conventional thread switching control in a processor is effective to a newly developed program or recompile-possible program, difficulty is encountered in employing it for recompile-impossible program or change-impossible program, such as in the case of the loss of a program source.

SUMMARY OF THE INVENTION

The present invention has been developed with a view to eliminating the above-mentioned problems, and it is therefore an object of the present invention to prevent a wait condition stemming from a loop from interfering with the execution of other threads without retouching software.

For this purpose, in accordance with an aspect of the present invention, there is provided a processor system made to carry out a plurality of threads, each having one or more instructions, in parallel through the use of one or more arithmetic units, comprising a multithread control unit for selectively making the switching among the threads to be executed in the arithmetic unit, a loop predicting (estimating) unit for predicting a loop of an instruction string on the basis of a processing history of a branch instruction in the thread, and a loop detecting unit for, when the loop predicting unit predicts the loop, detecting the loop on the basis of the instruction, wherein, when the loop detecting unit detects the loop, the multithread control unit makes the switching from the thread which is in execution in the arithmetic unit to a different thread.

In this case, it is also appropriate that the loop predicting unit includes a branch history information storing unit made to store the processing history of the branch instruction in the thread as branch history information, a branch predicting unit for making a prediction on the branch instruction on the basis of the branch history information stored in the branch history information storing unit, and a prediction evaluating unit for making an evaluation as to whether the prediction on the branch instruction made in the branch predicting unit hits (comes true) so that the prediction on the loop is made when the evaluation result in the prediction evaluating unit shows that the prediction on the branch instruction continuously hits a predetermined number of times or more.

In this connection, the branch history information storing unit and the branch predicting unit can also be provided in an instruction fetching unit which fetches the instruction.

In addition, it is also appropriate that the loop detecting unit detects a fixed-point-mode load instruction for writing data in a fixed-point register in the instruction string to detect the occurrence of a spin-loop on the basis of the fixed-point-mode load instruction, or that the loop detecting unit includes a counter for counting the number of times of continuous occurrence of the same fixed-point-mode load instruction in the instruction string, which is in a continuing condition, to detect the spin-loop when a value of the counter exceeds a predetermined value.

Still additionally, it is also appropriate that the loop detecting unit resets the counter when a former detected load instruction and the latter detected load instruction are different from each other, or that the loop detecting unit monitors the update writing of the detected fixed-point-mode load instruction in an address production register to be used for a memory address production and, when detecting the writing in the address production register, resets the counter, or that the loop detecting unit monitors whether or not a store instruction exists in the instruction string and, when detecting the store instruction, resets the counter.

Yet additionally, it is also appropriate that, when detecting, in the instruction string, a relative branch instruction in which a target address of the branch instruction is indicative of its own address, the loop detecting unit detects the loop.

Moreover, the loop detecting unit can also be provided in an instruction decoding unit made to decode the instruction into an executable condition in the arithmetic unit.

Furthermore, in accordance with a further aspect of the present invention, there is provided a thread switching control method for use in a processor system made to carry out a plurality of threads, each having one or more instructions, in parallel through the use of one or more arithmetic units, comprising a loop predicting step of predicting a loop of an instruction string on the basis of a processing history of a branch instruction in the thread, a loop detecting step of, when the loop is predicted in the loop predicting step, detecting the loop on the basis of the instruction, and a thread switching step of, when the loop is detected in the loop detecting step, making the switching from the thread which is in execution in the arithmetic unit to a different thread.

In this case, it is also appropriate that the loop predicting step includes a branch history information storing step of storing the processing history of the branch instruction in the thread as branch history information, a branch predicting step of making a prediction on the branch instruction on the basis of the branch history information stored in the branch history information storing step, and a prediction evaluating step of making an evaluation as to whether the prediction on the branch instruction made in the branch predicting step hits (comes true) so that the prediction on the loop is made when the evaluation result in the prediction evaluating step shows that the prediction on the branch instruction continuously hits a predetermined number of times or more.

In addition, it is also appropriate that the loop detecting step detects a fixed-point-mode load instruction for writing data in a fixed-point register in the instruction string to detect the occurrence of a spin-loop on the basis of the fixed-point-mode load instruction.

Still additionally, it is also appropriate that the loop detecting step detects the spin-loop when a count value of a counter, which counts the number of times of continuous occurrence of the same fixed-point-mode load instruction in the instruction string which is in a continuous condition, exceeds a predetermined value.

Yet additionally, it is also appropriate that the loop detecting step resets the counter when a former detected load instruction and the latter detected load instruction are different from each other.

Moreover, it is also appropriate that the loop detecting step monitors the update writing of the detected fixed-point-mode load instruction in an address production register to be used for a memory address production and, when detecting the writing in the address production register, resets the counter.

Still moreover, it is also appropriate that the loop detecting step monitors whether or not a store instruction exists in the instruction string and, when detecting the store instruction, resets the counter.

Yet moreover, it is also appropriate that, when detecting, in the instruction string, a relative branch instruction in which a target address of the branch instruction is indicative of its own address, the loop detecting step detects the loop.

According to the present invention, the thread switching is made when an instruction string loop is detected, which can reduce the delays of the processing due to the loop and can efficiently assign the processing in the processor to a plurality of threads to increase the processing speed, and which permits the realization by hardware without retouch-

BRIEF DESCRIPTION OF THE DRAWINGS

FIG. 16 is an illustration for explaining an SMT method;

DESCRIPTION OF THE PREFERRED EMBODIMENTS

An embodiment of the present invention will be described hereinbelow with reference to the drawings.

Figure 1:
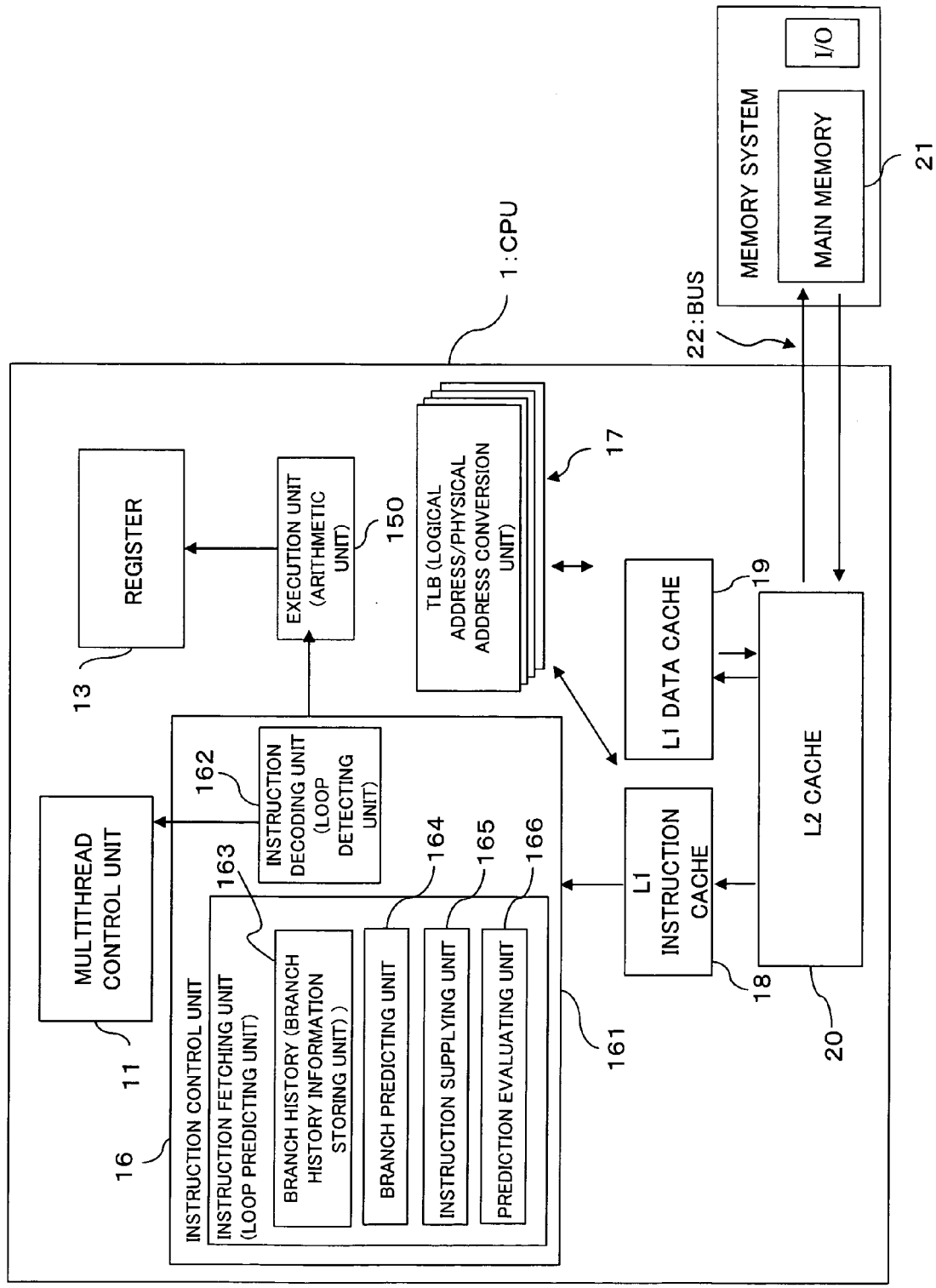
FIG. 1 is a block diagram showing a configuration of a processor system according to an embodiment of the present invention.

FIG. 1 is a block diagram showing a configuration of a processor system according to an embodiment of the present invention.

A CPU (Central Processing Unit) 1 serving as a processor system according to the embodiment of the present invention is constructed as a multithread processor capable of carrying out plurality of threads (programs) in parallel through the use of one or more execution units (arithmetic units) 150.

In addition, this CPU 1 has a so-called spin-loop detectable hardware configuration which monitors data (shared data, monitored data) to be stored in one specified area on a memory and makes a loop to continue waiting until the value of the monitored data reaches an expected value.

In this case, the spin-loop to be detected by the CPU 1 according to the present invention signifies an instruction string which continuously monitors one portion of data on a memory and which satisfies the following conditions (a), (b), (c) and (d).

(a) having one fixed-point-mode load instruction;
(b) having one branch;
(c) having a constant load address (no address updating); and
(d) having no store instruction (no memory updating).

Referring to SPARC Architecture Manual, an example of typical instruction string of the spin-loop is expressed below as an SPARC instruction set.

spin-loop:

|  |  |
|---|---|
| load [lock], %10 | (1) |
| tst %10 | (2) |
| bne spin-loop | (3) |
| nop | (4) |

The load instruction indicated by (1) signifies that data is fetched from a lock address [lock] where a lock variable is placed on a memory and written in a register %10. Moreover, (2) signifies that a check as to whether or not the data fetched is "0" is made to return a condition code indicative of whether or not it is "0". In the case of SPARC instruction, an instruction referred to as "Orcc" is used for ORing "%10" with "0" so that, if it is "0", the Z (Zero) bit of the condition code is set at "1" and then returned while, if it is not "0", the Z bit is set at "0" and then returned.

Still moreover, (3) signifies a condition branch for making a decision, on the basis of the Z bit of the condition code in (2), as to whether or not a branch is made or not. When the Z bit is "0", that is, if the result of (2) shows that the fetch data is not "0", the operational flow again returns to (1) for fetching the memory data where the lock variable exists. Yet moreover, (4) signifies a delay slot of the branch instruction (3), at the execution of the branch instruction (3), it being executed prior to jumping to the branched destination. In this case, "nop" represents "no-operation" which, in fact, is an instruction which does nothing.

As FIG. 1 shows, this CPU 1 is made up of a multithread control unit 11, a register 13, an execution unit 150, an instruction control unit 16, a TLB (logical address/physical address conversion unit) 17, an L1 instruction cache 18, an L1 data cache 19 and an L2 cache 20, with the CPU 1 connected through a bus 22 to a main memory 21 to be communicable.

The TLB (Translation Look-aside Buffer; logical address/physical address conversion unit) 17 is a kind of cache provided for the purpose of reducing the penalty of the page table reference occurring due to the conversion from a logical address to a physical address, and it is for preserving the reference-made address and the history on the conversion information to realize the speed-up of the address conversion.

The execution unit (arithmetic unit) 150 is for conducting various types of processing (instruction processing) through the use of register windows 12 or the like and, for example, functions as an arithmetic unit (execution arithmetic unit) to carry out various types of arithmetic operations.

The multithread control unit 11 is for selectively switching threads to be executed in the execution unit 150 and, for example, it carries out the control for making the switching from a thread which is in execution in the execution unit 150 to a different thread whenever a predetermined period of time elapses or whenever a cache miss occurs in the L1 instruction cache 18, the L1 data cache 19 or the L2 cache 20.

In addition, as will be mentioned later, the multithread control unit 11 is made to carry out the thread switching even in a case in which an instruction decoding unit (loop detecting unit) 162 detects a loop (spin-loop, self-loop).

The main memory 21 is a memory provided in a memory system located in the exterior of the CPU 1 and is for storing various types of instructions and data, and is connected through a bus 22 to the CPU 1 to be communicable so that the CPU 1 reads out instructions and data from the main memory 21 through the bus 22 or the like when the instructions and data needed for the processing/execution in the execution unit 150 do not exist in the L1 instruction cache 18, the L1 data cache 19 and the L2 cache 20 (at the occurrence of a cache miss).

The L1 instruction cache 18 is a primary cache for storing instructions to be executed in the execution unit 150, and the L1 data cache 19 is a primary cache for storing various types of data used for the execution of instructions in the execution unit 150. The L2 cache 20 is a secondary cache for storing various types of instructions and data. That is, in this CPU 1, a plurality of caches (L1 instruction cache 18, L1 data cache 19, L2 cache 20) are placed hierarchically.

The instruction control unit 16 is made to acquire instructions from the primary instruction cache 18, the L2 cache 20 or the main memory 21 for carrying out the control for the execution in the execution unit 150 and, as shown in FIG. 1, is composed of an instruction fetching unit (loop predicting unit) 161 and an instruction decoding unit (loop detecting unit) 162. The instruction fetching unit 161 is made to acquire (fetch) an instruction code to be processed in the execution unit 150 from the L1 instruction cache 18, the L2 cache 20 or the main memory 21 and hands it over to the instruction decoding unit 162, and is composed of a branch history (branch history information storing unit) 163, a branch predicting unit 164, an instruction supplying unit 165 and a prediction evaluating unit 166.

In the following description, sometimes, the L1 instruction cache 18 and the L2 cache 20 will collectively be referred to simply as an instruction cache.

Figure 2:
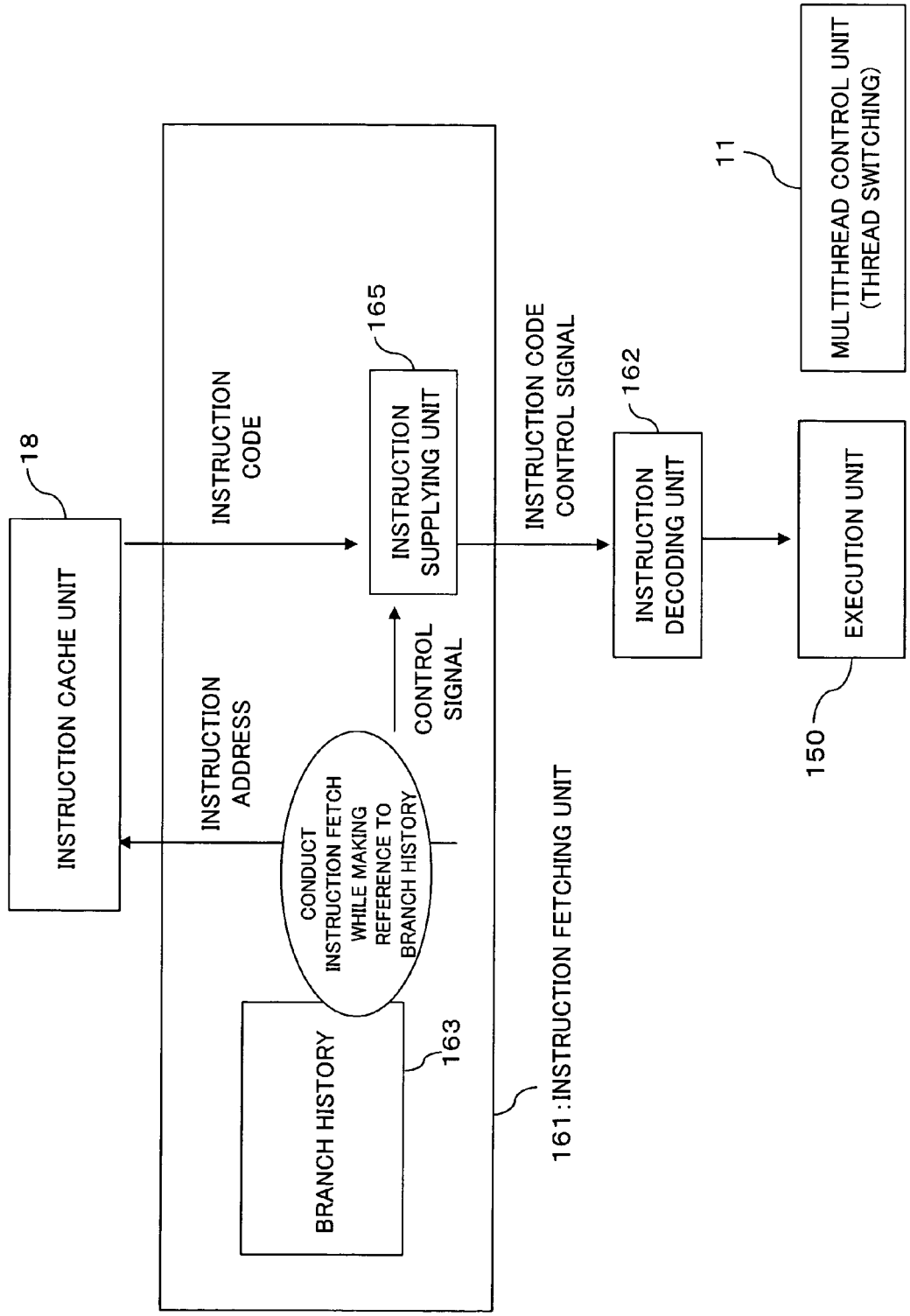
FIG. 2 is an illustration of a flow of signals in an instruction control unit of the processor system according to the embodiment of the present invention.
Figure 3:
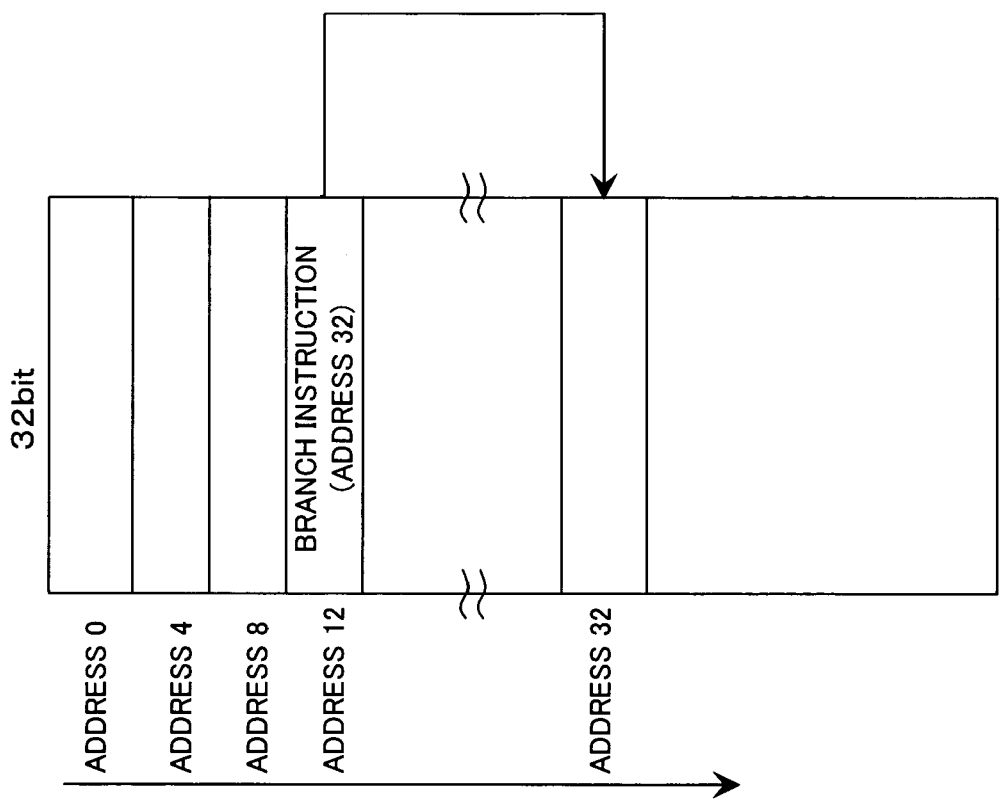
FIG. 3 is an illustration of an example of a state in which a thread to be executed in the processor system according to the embodiment of the present invention is stored in a main memory.
Figure 4:
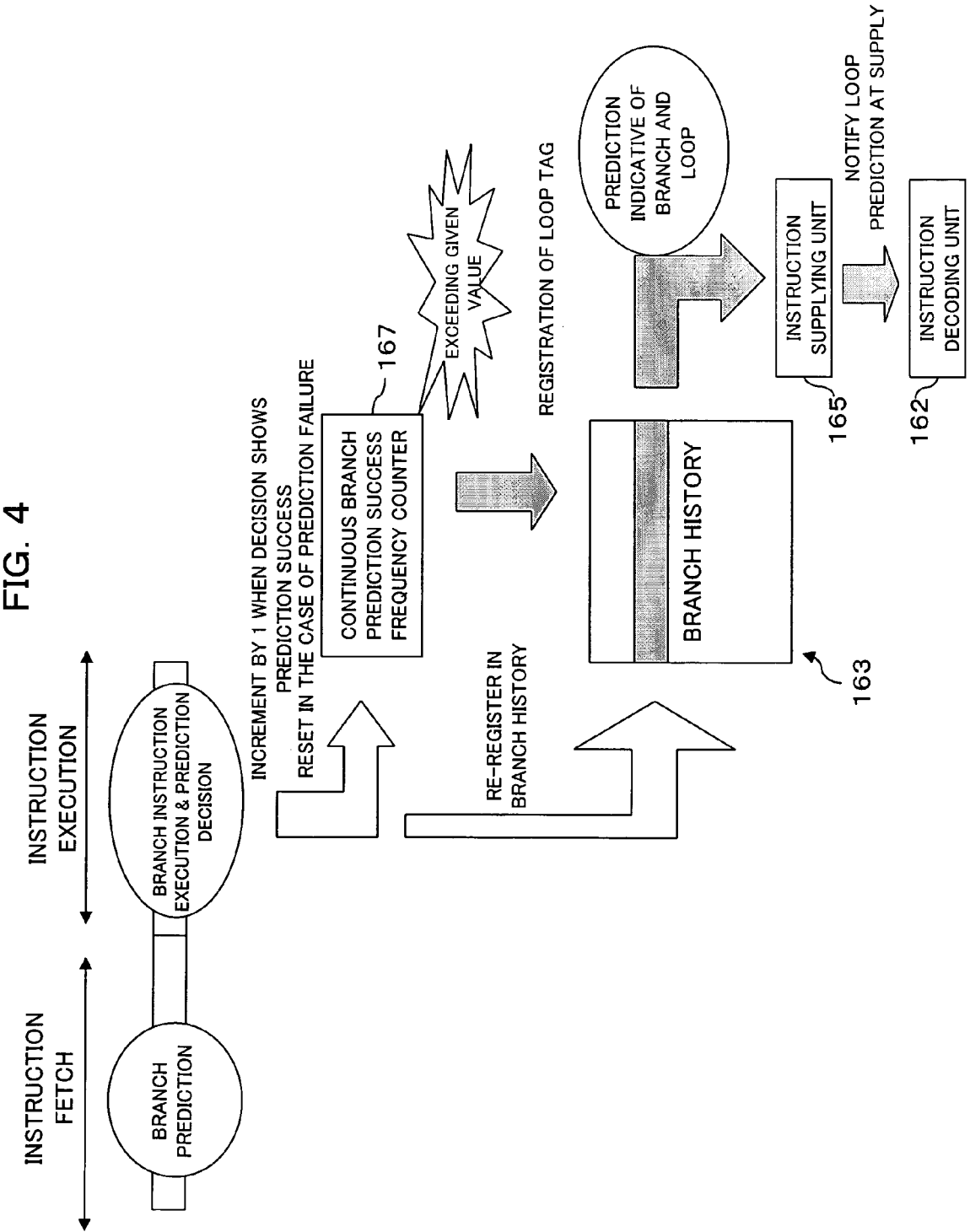
FIG. 4 is an illustration of a loop prediction process in the instruction control unit of the processor system according to the embodiment of the present invention.

FIG. 2 is an illustration of a flow of signals in the instruction control unit 16 of this CPU 1, FIG. 3 is an illustration of an example of a state in which a thread to be executed in this CPU 1 is stored in the main memory 21, and FIG. 4 is an illustration of a loop prediction (estimation) process in the instruction control unit 16 of this CPU 1. Incidentally, in the example of the thread shown in FIG. 3, let it be assumed that a branch instruction for branching to an address 32 is placed at an address 12.

The branch history (branch history information storing unit) 163 is for preserving and storing a processing history on branch instruction in a thread and a processing history about all branch processing conducted in the thread execution. Concretely, with respect to a branch instruction occurring in a thread shown in FIG. 3, the branch history 163 registers at least a branching address (for example, address 12) and a branched-to address (for example, address 32) in a state associated with each other and further stores a loop tag (control signal; mentioned in detail later) which is a flag to the effect of a loop in a state associated with the branching address and the branched-to address.

The branch predicting unit 164 is for making a prediction on a branch instruction on the basis of the branch history information stored as the branch history 163. Concretely, when fetching an instruction from the instruction cache, the branch predicting unit 164 makes reference to the branch history 163 on the basis of the address storing this instruction and, in a case in which the same address is registered as a branching address in the branch history 163 and a flag is set with respect to that loop tag, makes a prediction to the effect that this instruction is a branch instruction included in the loop.

The instruction supplying unit 165 is for supplying an instruction code transferred from the instruction cache, together with a control signal or the like acquired from the branch history 163, to the instruction decoding unit 162. When the reference result to the branch history 163 in the branch predicting unit 164 shows that the same address is registered as a branching address in the branch history 163 and a flag is set with respect to that loop tag, the instruction supplying unit 165 notifies the instruction code and a control signal on the loop prediction to the instruction decoding unit 162.

The prediction evaluating unit 166 is for making an evaluation as to whether or not the prediction (branch prediction) on the branch instruction done in the branch predicting unit 164 hits (comes true). Concretely, with respect to the branch prediction in the branch predicting unit 164, the prediction evaluating unit 166 sees the actual processing result in the execution unit 150, thereby making an evaluation/decision as to whether or not the branch prediction comes true.

The instruction control unit 16 includes a continuous branch prediction success frequency counter 167 (see FIG. 4). This continuous branch prediction success frequency counter 167 is made to register the frequency (continuous number of times) of hit of the branch prediction in the prediction evaluating unit 166 in a state associated with each of the branch instructions which is an object of prediction in the branch predicting unit 164.

As shown in FIG. 4, the instruction control unit 16 is made to increment (+1) the value of the counter 167 when the prediction evaluating unit 166 makes an evaluation that the branch prediction comes true and resets (returns to 0) the evaluation frequency on the branch instruction when the prediction does not come true (prediction failure).

Moreover, when the evaluation result in the prediction evaluating unit 166 shows that the prediction on the branch instruction continuously comes true a predetermined number of times or more, the instruction fetching unit (loop predicting unit) 161 makes a prediction to the effect that it is a branch and a loop and sets a flag indicative of the loop prediction at the loop tag corresponding to the branch instruction in the branch history 163.

Still moreover, when the evaluation result in the prediction evaluating unit 166 shows that the prediction on the aforesaid branch instruction continuously comes true a predetermined number of times or more, the instruction fetching unit 161 makes a prediction to the effect that it is the loop.

That is, as shown in FIG. 2, when executing the program, the CPU 1 fetches an instruction from the instruction cache through the use of the instruction fetching unit 161. At this time, the CPU 1 makes reference to the branch history 163 in which the branch in the branch prediction feature (branch predicting unit 164) is registered as a history and, when the branch is predicted, makes an instruction fetch on the branched-to address. An instruction code is transferred from the instruction cache to the instruction supplying unit 165 and, in a state where control information (loop tag) such as a hit in the branch history 162 is further added thereto, the instruction code is supplied to the instruction decoding unit 162.

In addition, the branch predicting unit 164 of the branch prediction feature is provided with the counter 167 which, with respect to the fetched instructions which are predicted as being branched, counts the number of times of actual success of the branch prediction when the branch instruction is executed and resets it when the failure in prediction occurs. Still additionally, in the entry of the branch history 163, there is prepared a bit for a loop tag which is indicative of the fact that this branch instruction is included in a continuously branching loop.

In a case in which the value of the counter 167 which counts the branch prediction success exceeds a predetermined value, a loop tag is then set in the entry of the branch history 163 in conjunction with the branch instruction on which made is the decision indicating the branch prediction success. Thereafter, if the instruction string supplied by the instruction supplying unit 165 hits the branch history 163 and the bit of the loop tag is set, the fact that the subsequent instruction string is included in the continuous branch prediction hitting loop is reported to the instruction decoding unit 162. This means that the report is continuously made while a trap, interruption or the like does not occur and the failure in branch prediction does not occur.

Figure 5:
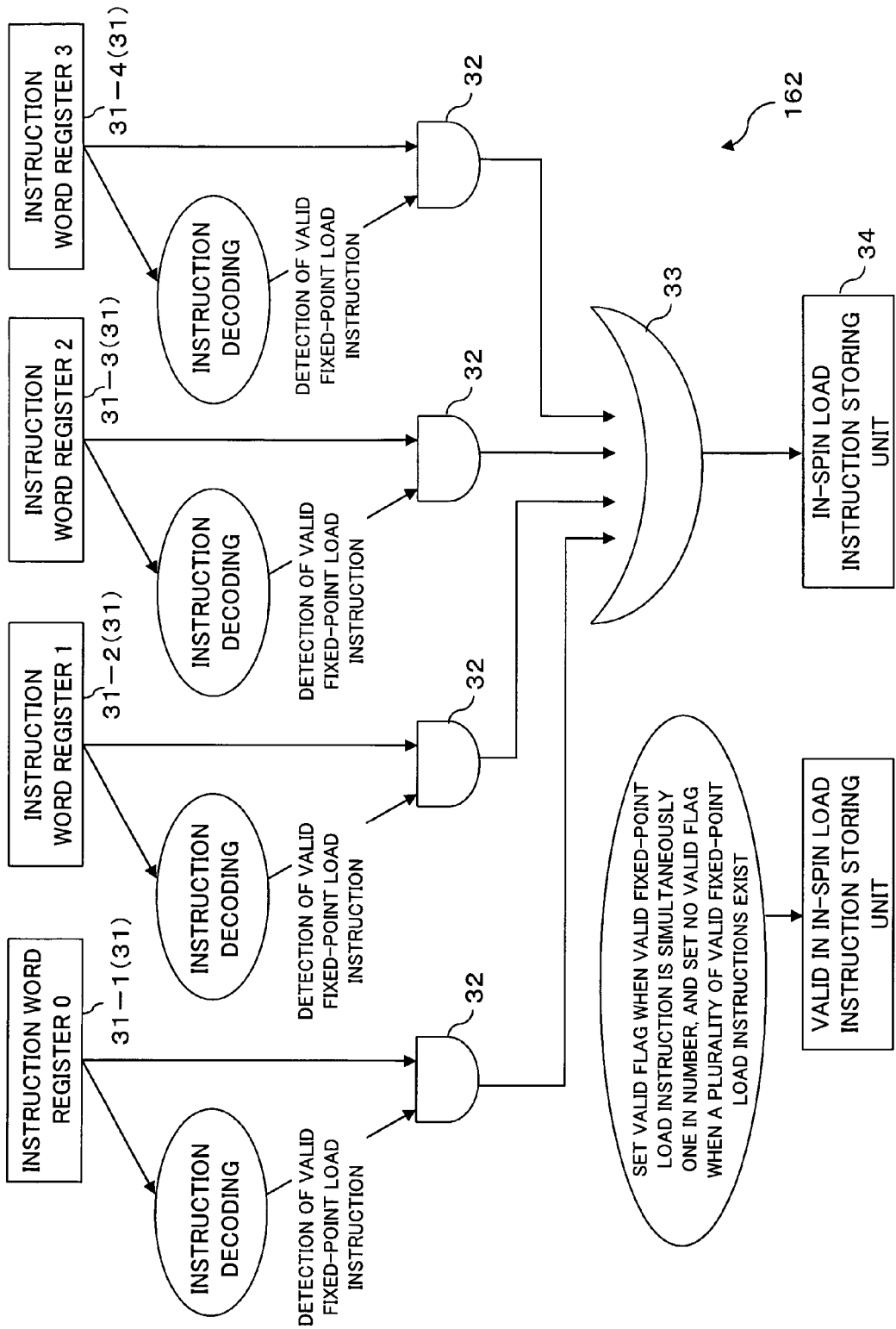
FIG. 5 is an illustrative view showing an example of a configuration of an instruction decoding unit of the processor system according to the embodiment of the present invention.

FIG. 5 is an illustrative view showing an example of a configuration of the instruction decoding unit 162 in this CPU 1.

The instruction decoding unit 162 is for decoding an instruction code acquired by the instruction fetching unit 161. As shown in FIG. 5, the instruction decoding unit 162 is composed of a plurality of (four in this embodiment) instruction word registers 31-1 to 31-4, a plurality of (four in this embodiment) AND circuits 32 and an OR circuit 33. The instruction decoding unit 162 carries out the instruction decoding on an instruction stored in each of the instruction word registers 31-1 to 31-4 to make a decision as to whether or not it is a valid (effective) fixed-point load instruction.

As the reference numerals for depicting the instruction word registers, numerals 31-1 to 31-4 are used when there is a need to specify one of the plurality of instruction word registers, while numeral 31 is used when indicating an arbitrary instruction word register(s).

Moreover, in a case in which a valid fixed-point load instruction is detected in at least one of the instruction word registers 31-1 to 31-4, this fixed-point load instruction is stored in an in-spin load instruction storing unit 34. Thus, in this embodiment, the instruction decoding unit 162 can simultaneously decode a maximum of four instructions. The instruction supplying unit 165 which supplies an instruction to the instruction decoding unit 162, when the instruction hits the branch history 163, caries out the control so that the hitting instruction and the instruction existing at the branched-to address (target address) are supplied to a different cycle. That is, in the above-mentioned spin-loop example, the instructions in one loop can simultaneously be supplied to the instruction decoding unit 162, and the instructions in the next loop are supplied to a different cycle.

Moreover, usually, a load instruction used in a spin-loop is written in a fixed-point register. In the following description of this embodiment, the load instruction to be written in this fixed-point register will be referred to as a fixed-point-mode load instruction. While receiving, from the instruction fetching unit (loop predicting unit) 161, a report to the effect that an instruction string supplied forms a loop, when decoding a fixed-point-mode load instruction, the instruction decoding unit 162 puts an operation code of this fixed-point-mode load instruction in the in-spin load instruction storing unit (latch) 34.

Meanwhile, in the case of the spin-loop made to monitor memory data at one place, of the instructions (a maximum of four instructions in this embodiment) to be simultaneously supplied to the instruction decoding unit 162, a valid load instruction is only one in number. Therefore, in this CPU 1, the in-spin load instruction storing unit 34 for storing an operation code of the fixed-point-mode load instruction is prepared only for one instruction.

Moreover, in this case, with respect to the instruction word registers 31-1 to 31-4 for storing a maximum of four instructions, the valid load instruction represents an instruction other than the instructions which are not executed for the branch prediction or the like. For example, of the instruction word registers 31-1 to 31-4 made to store instructions and provided in the instruction decoding unit 162 capable of decoding four instructions, the instruction stored in the instruction word register 31-1 (instruction word register 0) is a branch instruction and, when predicted as being branched, the instruction stored in the instruction word register 31-2 (instruction word register 1) can be processed as a delay slot, while the instructions stored in the instruction word registers 31-3 and 31-4 (instruction word registers 2 and 3) are not executed. In this case, the instructions stored in the instruction word registers 0 and 1 become a valid instruction, and the instructions stored in the instruction word registers 2 and 3 become an invalid instruction.

Still moreover, as shown in FIG. 5, only when only one load instruction is included in the instruction string decoded simultaneously and this load instruction is a fixed-point-mode load instruction, the instruction decoding unit 162 sets a valid signal for the load instruction stored in the in-spin load instruction storing unit 34, and does not set a valid signal when a plurality of load instructions are included in the instruction string.

Yet moreover, the instruction decoding unit 162 is equipped with a counter (in-spin load instruction agreement frequency counter 36 (see FIG. 6)) made to count the number of times of continuous occurrence of the same fixed-point-mode load instruction in a continuous instruction string and, when the value of this in-spin load instruction agreement frequency counter 36 exceeds a predetermined value, it detects the spin-loop.

FIGS. 6 to 9 are illustrations useful for explaining a method of setting the load instruction agreement frequency counter 36 while a loop prediction is reported in this CPU 1.

Figure 6:
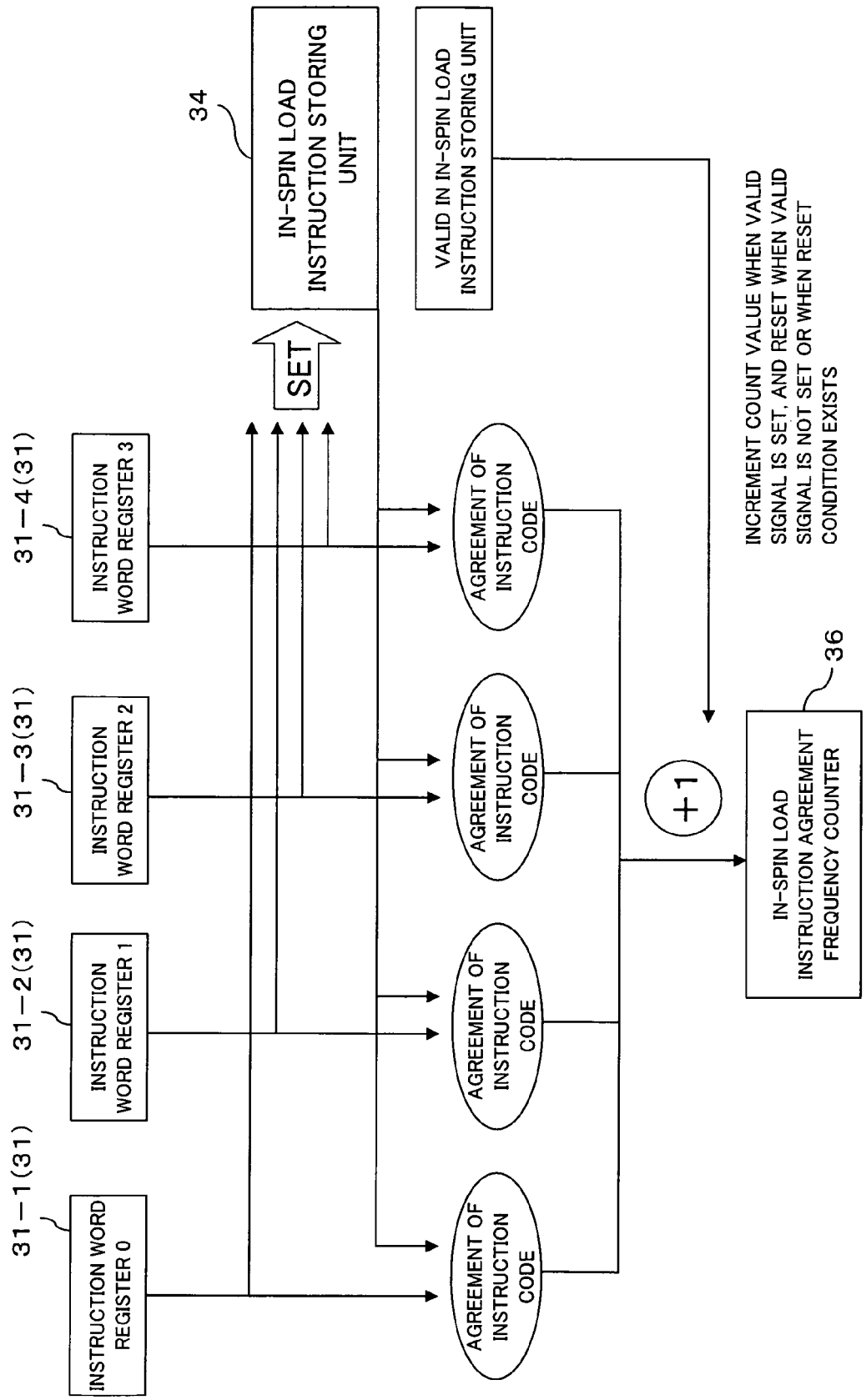
FIG. 6 is an illustration useful for explaining a method of setting a load instruction agreement frequency counter while a loop prediction is reported in the processor system according to the embodiment of the present invention.

In a case in which the next load instruction comes after a valid signal is set, as shown in FIG. 6, the instruction decoding unit 162 again puts the detected load instruction in the in-spin load instruction storing unit 34 and makes a decision as to whether or not this newly stored load instruction agrees with the previously stored load instruction. If these load instructions agree with each other, that is, when the same load instructions are continuously detected in the instruction decoding unit 162, the instruction decoding unit 162 adds (increments) 1 to the in-spin load instruction agreement frequency counter 36.

Figure 7:
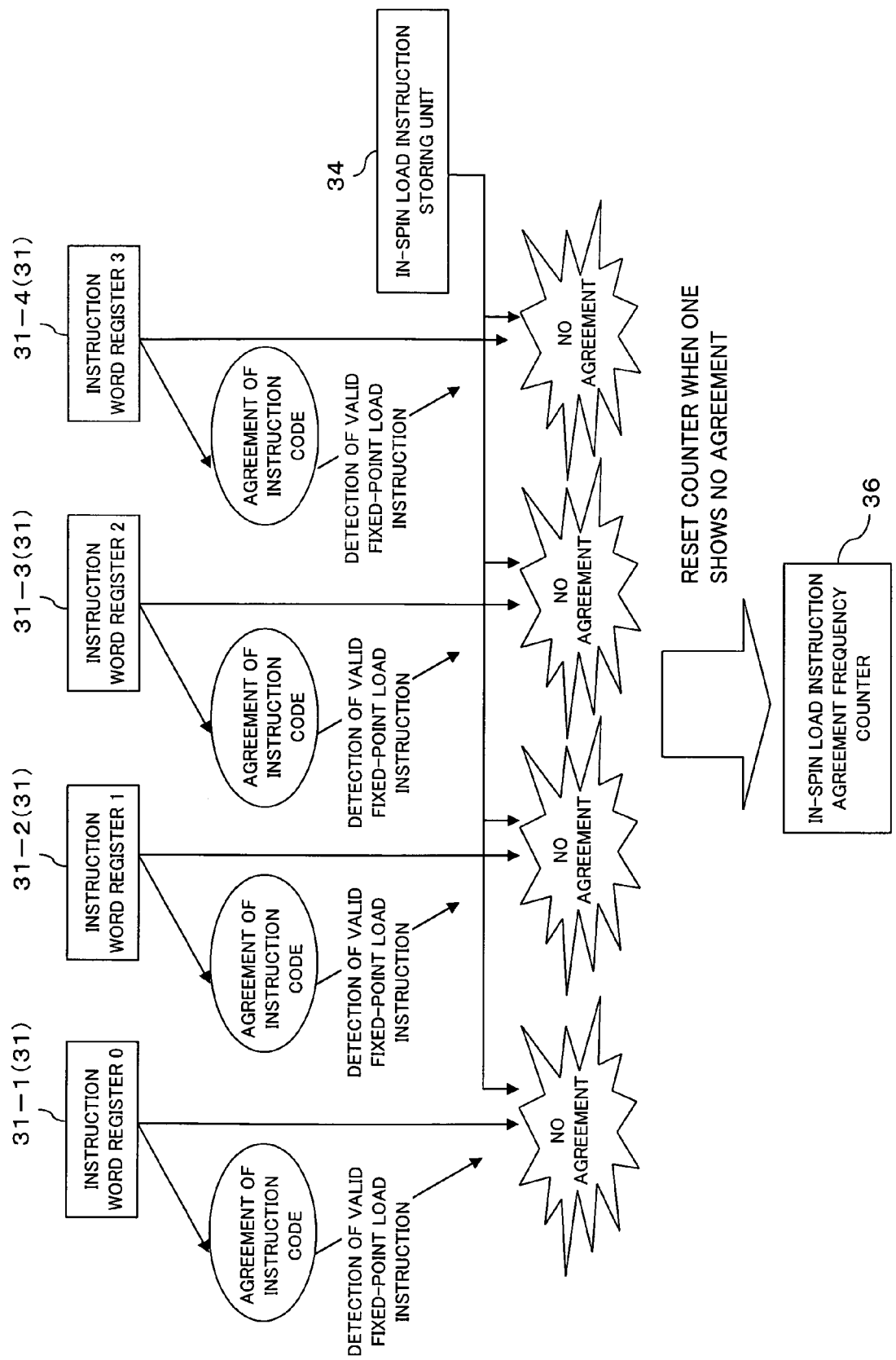
FIG. 7 is an illustration useful for explaining a method of setting a load instruction agreement frequency counter while a loop prediction is reported in the processor system according to the embodiment of the present invention.

In addition, if the newly detected valid fixed-point-mode load instruction does not agree with the load instruction previously stored in the in-spin load instruction storing unit 34, as shown in FIG. 7, the instruction decoding unit 162 resets the in-spin load instruction agreement frequency counter 36 to return it to "0".

Still additionally, while receiving, from the instruction fetching unit 161, the report to the effect that the instruction string supplied forms a loop (during the loop prediction report), with respect to all instructions including load instructions, the instruction decoding unit 162 monitors the updating of an operand register which produces memory addresses on the load instructions.

As methods of producing a memory address a load instruction fetches, for example, in the case of the SPARC instruction set, there are (1) a method of producing it by figuring out the sum of two fixed-point registers RS1 and RS2 and (2) a method of producing it by figuring out the sum of one fixed-point register RS1 and 13 immediate bits directly designated in an operation code.

When a load instruction stored in the in-spin load instruction storing unit 34 applies to the aforesaid case (1), the instruction decoding unit 162 monitors the updating of both the registers RS1 and RS2, and if the load instruction stored in the in-spin load instruction storing unit 34 applies to the aforesaid case (2), the instruction decoding unit 162 monitors the updating of only the register RS1.

Figure 8:
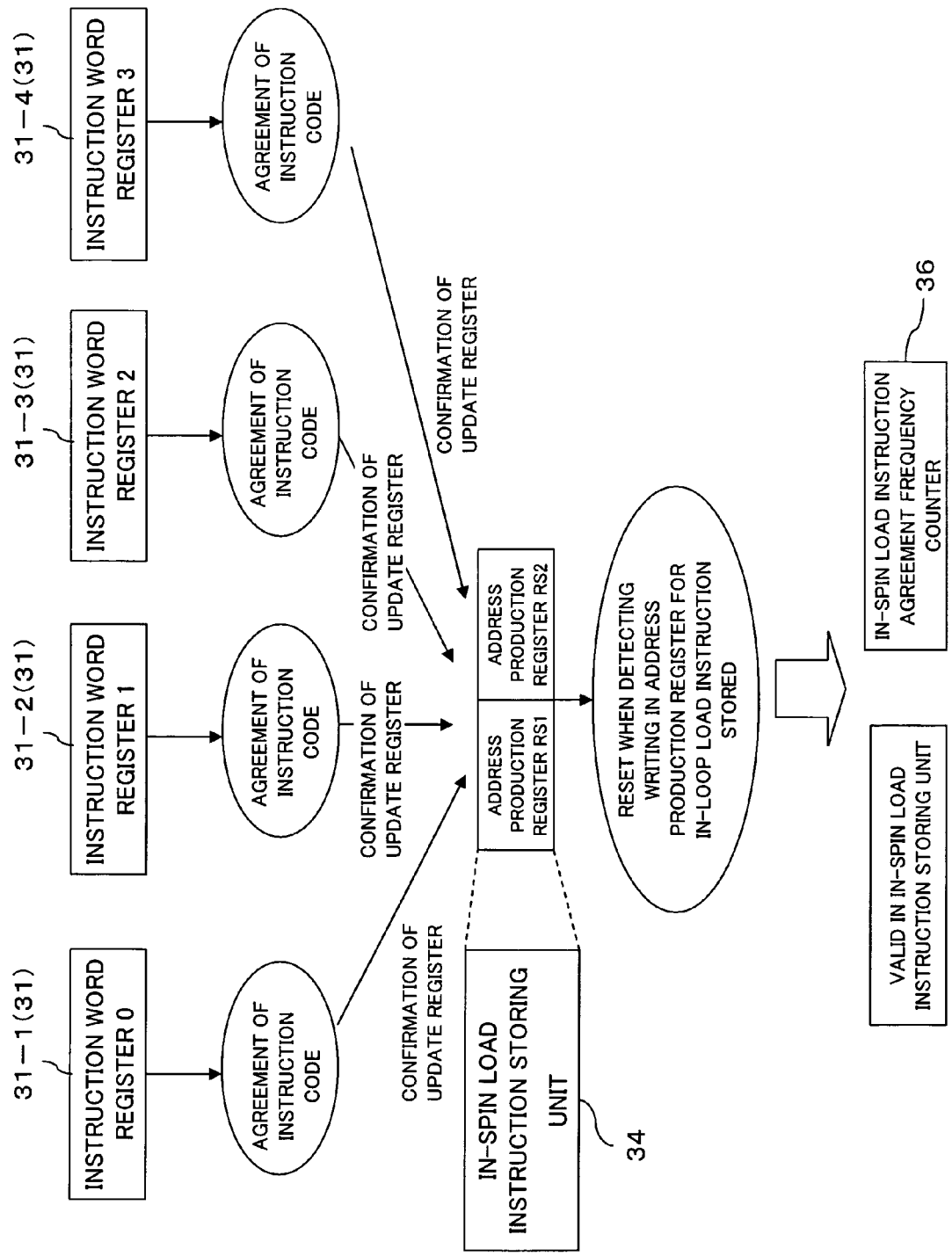
FIG. 8 is an illustration useful for explaining a method of setting a load instruction agreement frequency counter while a loop prediction is reported in the processor system according to the embodiment of the present invention.

Moreover, as shown in FIG. 8, in either case (1) or (2), in response to the detection of the updating of the register, the instruction decoding unit 162 considers that there is a possibility that a change of the address of the load instruction has taken place and resets the in-spin load instruction agreement frequency counter 36 to zero. Simultaneously, it resets the valid signal on the stored load instruction itself.

Figure 9:
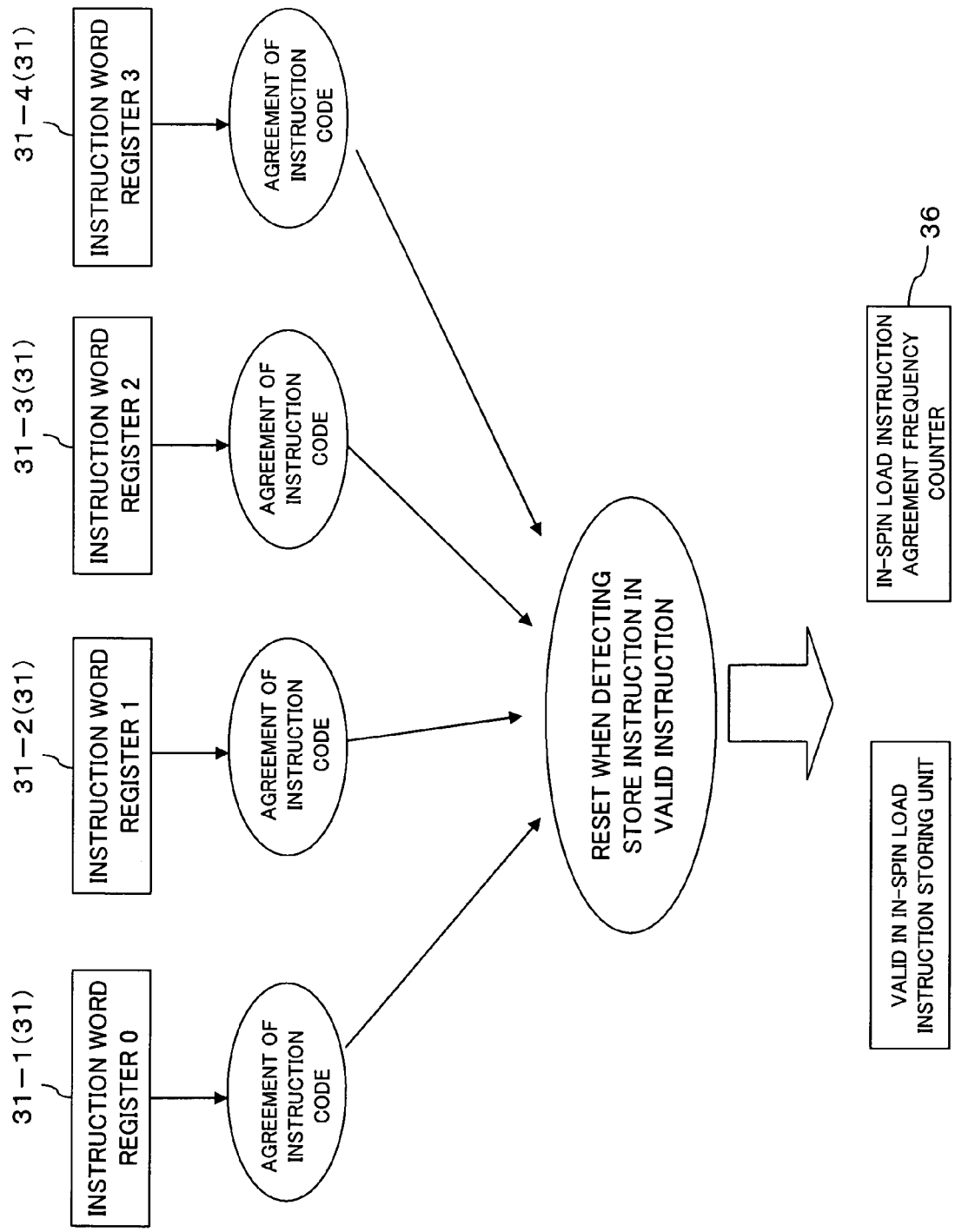
FIG. 9 is an illustration useful for explaining a method of setting a load instruction agreement frequency counter while a loop prediction is reported in the processor system according to the embodiment of the present invention.

Still moreover, originally, no store instruction for updating the contents of memory data is included in an instruction string constituting a spin loop where the monitoring of only data on the memory takes place and the processing does not advance. Therefore, in this CPU 1, as shown in FIG. 9, also in a case in which a store instruction appears in the decoded instruction string, the instruction decoding unit 162 resets the in-spin load instruction agreement frequency counter 36 to zero and, simultaneously, resets the valid signal of the load instruction itself.

Yet moreover, at the time that the failure of the branch prediction turns out after the execution of the branch instruction, the instruction decoding unit 162 resets the counter to 0 even when the inputted instruction string gets out of the loop, and also resets the valid signal of the load instruction itself at the same time.

Figure 10:
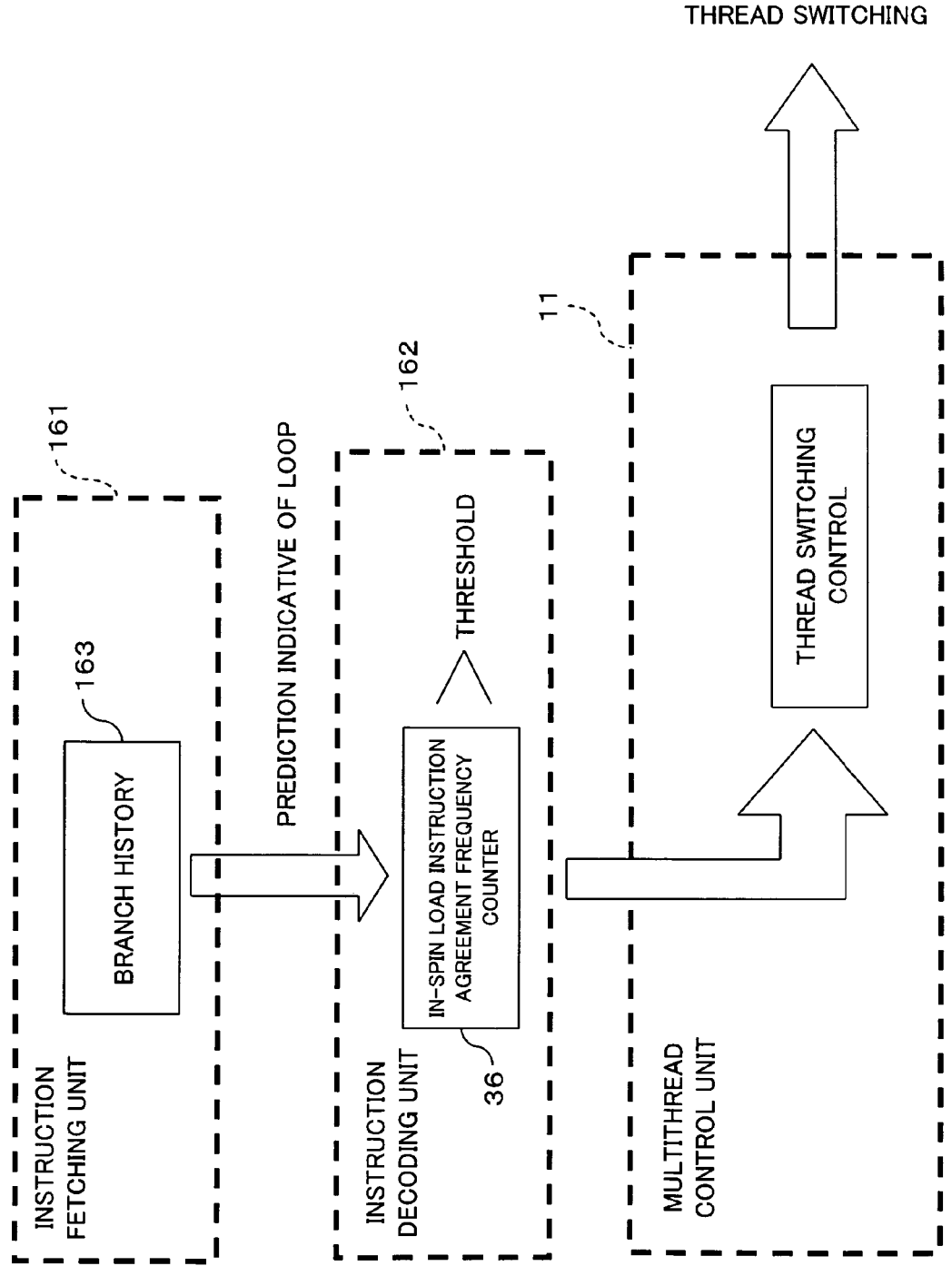
FIG. 10 is an illustrative view showing a thread switching flow based on the detection of a spin-loop in the processor system according to the embodiment of the present invention.

FIG. 10 is an illustrative view showing a flow of the thread switching based on the detection of a spin-loop in this CPU 1.

In this CPU 1, as shown in FIG. 10, while receiving the report to the effect that an instruction string supplied forms a loop from the instruction fetching unit 161, in a case in which the in-spin load instruction agreement frequency counter 36 detects that the value exceeds a given value (threshold), if, in the meantime, the same load instruction is continuously detected and the address of the load instruction does not change and no store instruction exists, the instruction decoding unit 162 makes a decision that it is a spin-loop, that is, the instruction string which is presently in execution monitors memory data at one place, and outputs a thread switching request (thread switching request signal) to the multithread control unit 11.

This thread switching request signal is continuously outputted while the value of the in-spin load instruction agreement frequency counter 36 exceeds the threshold. The thread control unit 11 receives this thread switching request signal and makes the switching from the thread in execution to a different thread if satisfied is a predetermined condition (thread switching condition), such as when the elapsed time after the last thread switching exceeds a predetermined time or when at least one instruction reaches completion.

Furthermore, in addition to the aforesaid spin-loop which monitors memory data at one place, this CPU 1 is made to additionally detect the self-loop signifying a continuous loop for itself until an interruption arises from a different processor or an IO (Input/Output).

Figure 11:
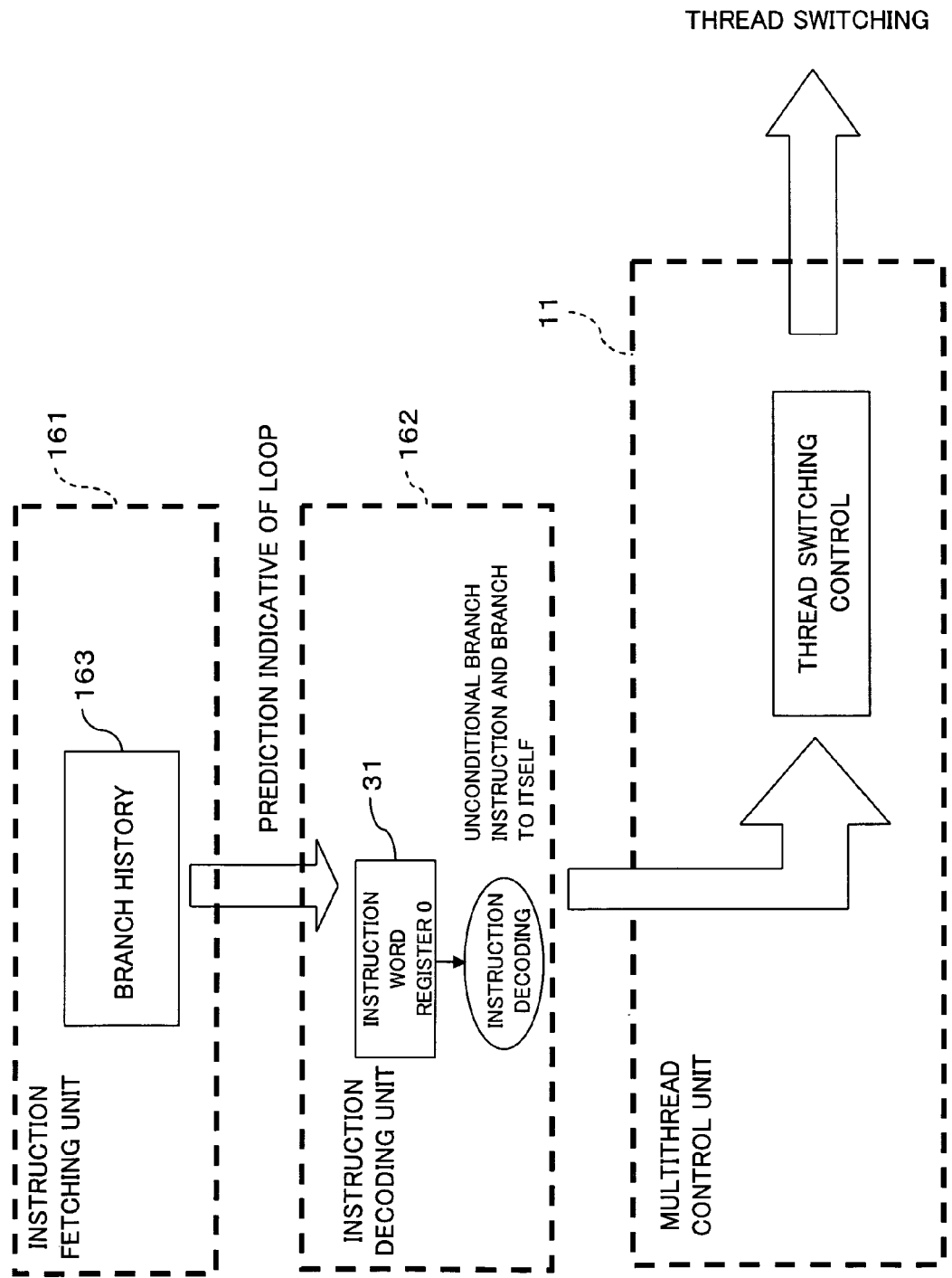
FIG. 11 is an illustrative view showing a thread switching flow based on the detection of a self-loop in the processor system according to the embodiment of the present invention.

FIG. 11 is an illustrative view showing a flow of thread switching based on the detection of a self-loop in this CPU 1.

An example of an instruction string of the self-loop in the case of an SPARC instruction set is as follows.

self-loop:

$$\text{Ba self-loop} \quad (1)$$

$$\text{nop} \quad (2)$$

In this case, the instruction ba of (1) is an unconditional relative branch instruction (branch always). Concretely, this ba instruction indicates an unconditional branch of Branch on Integer Condition Codes (Bicc) and Branch on Integer Condition Codes (Bpcc) in the SPARC instruction.

For executing this instruction, a branch takes place irrespective of condition. Moreover, a relative address designated by an operation code is taken as, in addition to an address of (1) itself, a branched-to target address, and the branched-to destination can be determined from the operation code and its own address at the instruction decoding. This is referred to as a direct branch instruction. On the other hand, in the case of an indirect branch instruction which determines a branched-to target address on the basis of a register value, not until the register readout takes place, the branched-to destination is found. Thus, the branched-to target address is not clear at the instruction decoding. In a case in which the relative address value is "0"for the direct branch, at the instruction decoding, it turns out that it is a branch to itself. Incidentally, the instruction nop in (2) represents a delay slot in (1), which does not conduct processing.

First, the instruction decoding unit 161 receives the report to the effect that a hit on the branch history 163 used for the detection of a spin-loop continuously occurs and makes a decision indicating a loop.

As shown in FIG. 11, when a hit on the branch history 163 takes place, the instruction supplying unit 165 (instruction fetching unit 161) supplies an instruction at the branch destination to the instruction decoding unit 162 in a different cycle and, hence, in the instruction word registers 31-1 to 31-4 of the instruction decoding unit 162 capable of decoding four instructions, the ba instruction in (1) is always supplied to the instruction word register 31-1 (instruction word register 0). Accordingly, a detection is made that, with respect to the instruction word register 0, it is an unconditional branch instruction ba, and the branched-to relative addresses are all zero.

When receiving, from the instruction supplying unit 165, the report to the effect that the instruction supplied is included in a loop and receiving an unconditional branch (self-loop) in which a branch is made to itself, the instruction decoding unit 162 makes a request for thread switching to the multithread control unit 11, and the multithread control unit 11 switches the thread, which is in execution in the execution unit 150, to a different thread.

As described above, with the processor system (CPU 1) according to the embodiment of the invention, in the vertical multithreading in which the thread switching is made with a cache miss or the elapse of a given period of time being used as a trigger, one data on a memory is monitored to detect the so-called spin-loop which makes a loop to continue waiting until the value of the monitored data reaches an expected value or the self-loop which continuously makes a branch to itself for waiting until an interruption or the like occurs from the external, thereby making the thread switching through the use of hardware. Thus, when the loop which is in the waiting condition and in which the processing on the program does not advance is detected through the use of the hardware, the switching to another thread is made, which improving the processing efficiency in the multithread processor.

Figure 12:
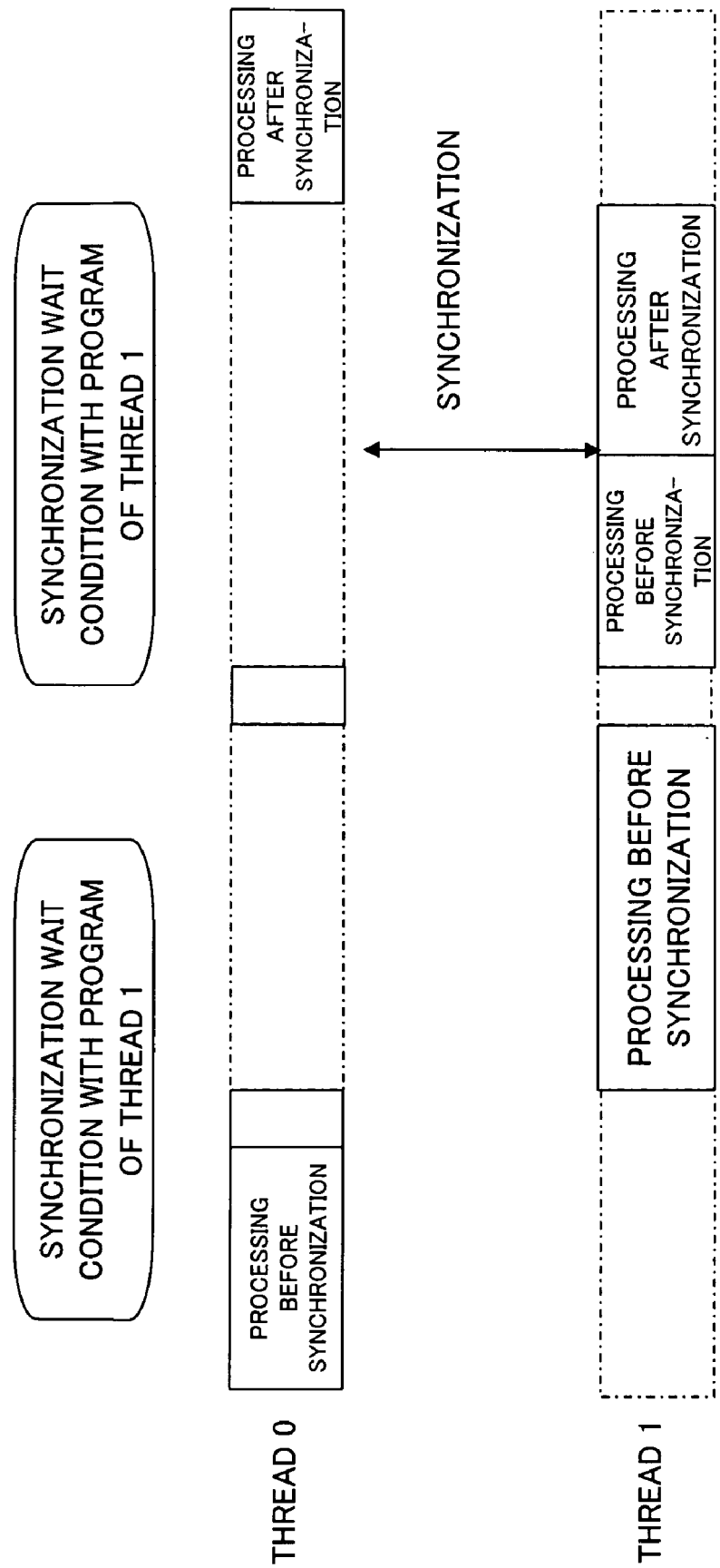
FIG. 12 is an illustration of an example of tread switching among a plurality of threads whenever a spin-loop is detected, in the processor system according to the embodiment of the present invention.
Figure 13:
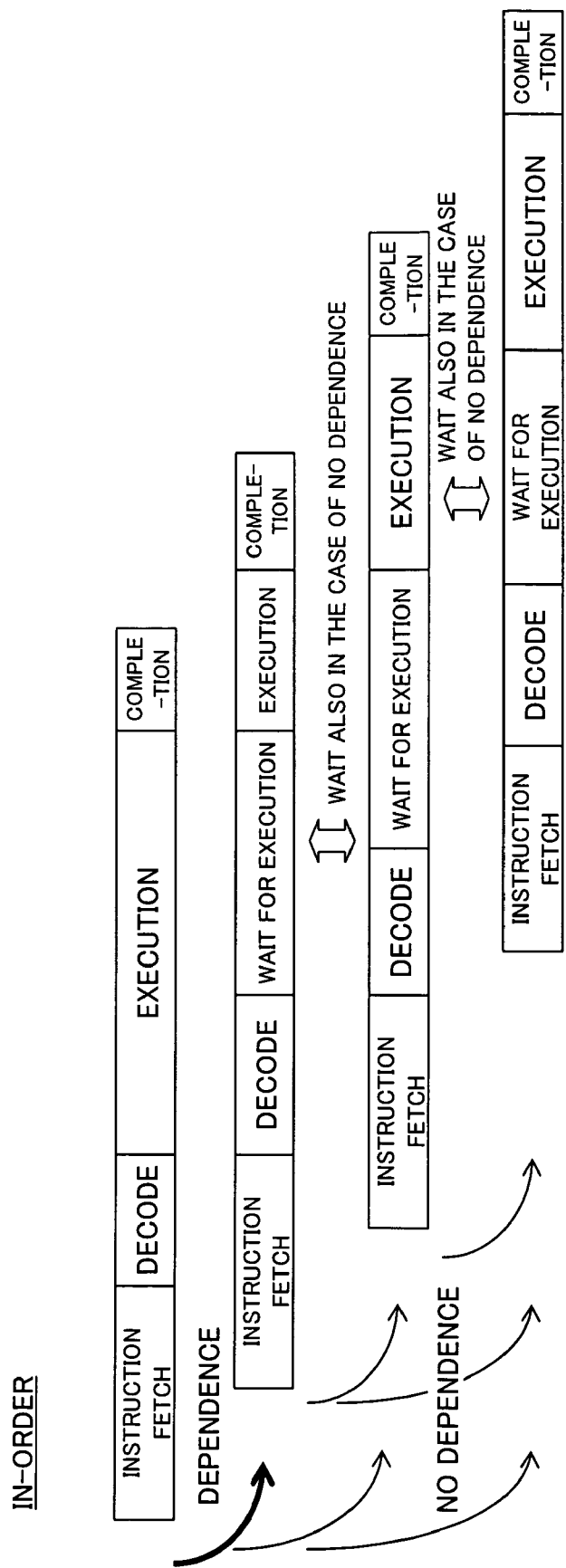
FIG. 13 is an illustration for explaining an in-order execution type processing method.
Figure 14:
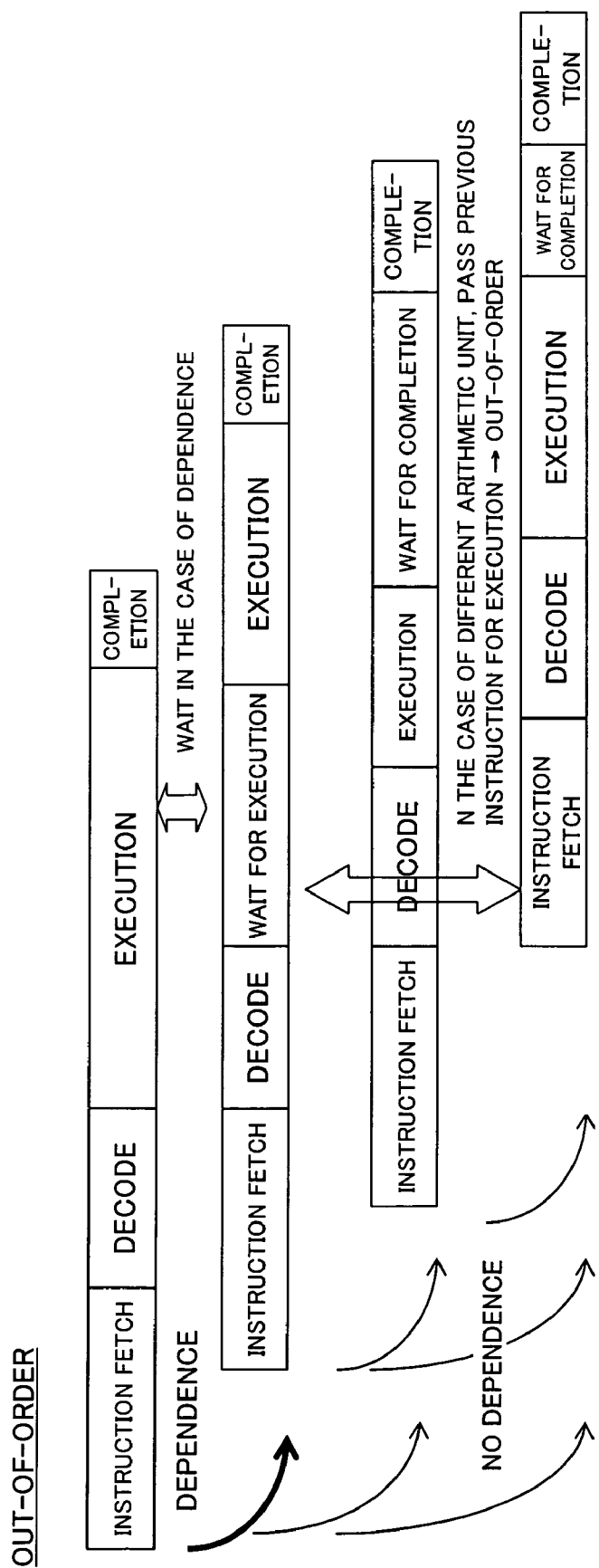
FIG. 14 is an illustration for explaining an out-of-order execution type processing method.
Figure 15A:
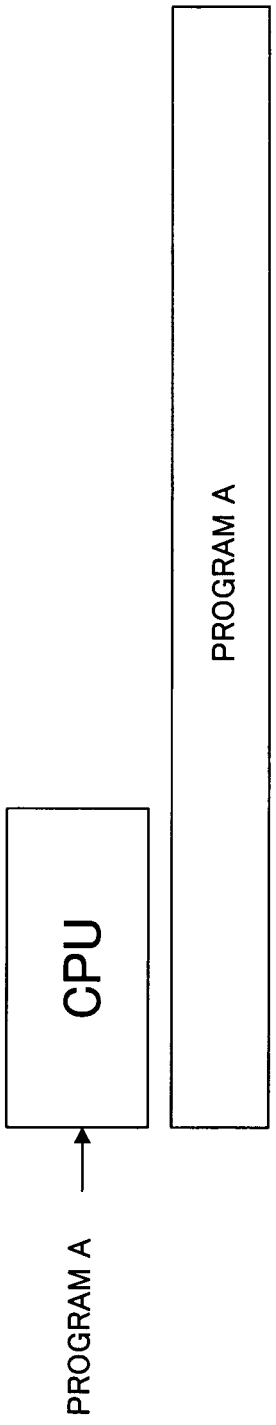
FIGS. 15A and 15B are illustrations for explaining a multithread processor system.
Figure 15B:
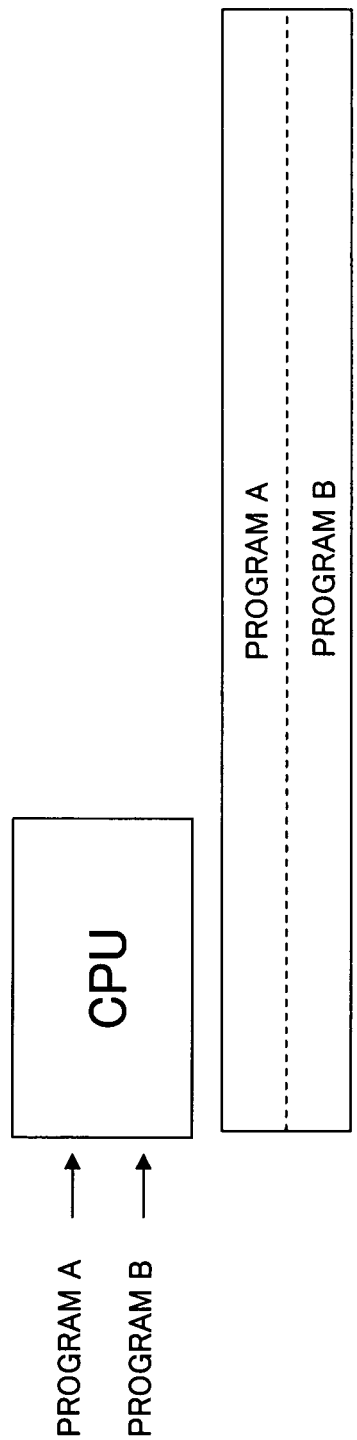
Figure 17:
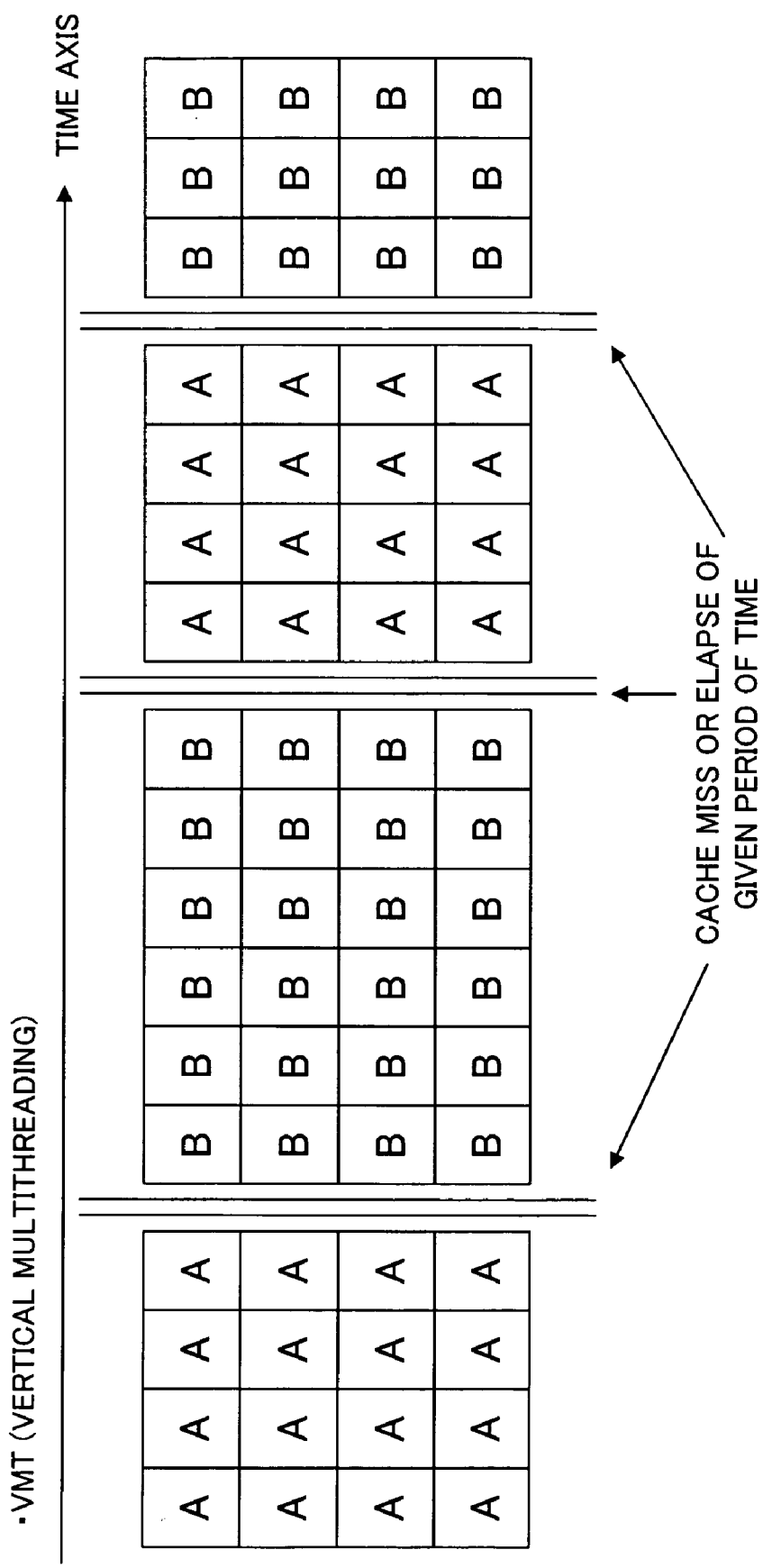
FIG. 17 is an illustration for explaining a VMT method.
Figure 18:
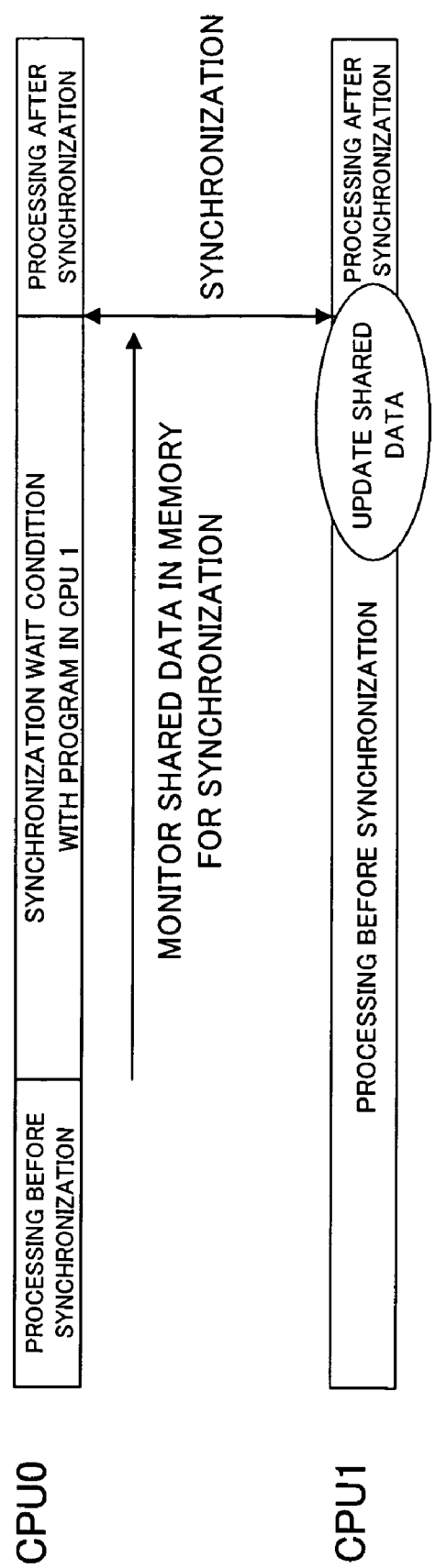
FIG. 18 is an illustration for explaining a spin-loop.
Figure 19:
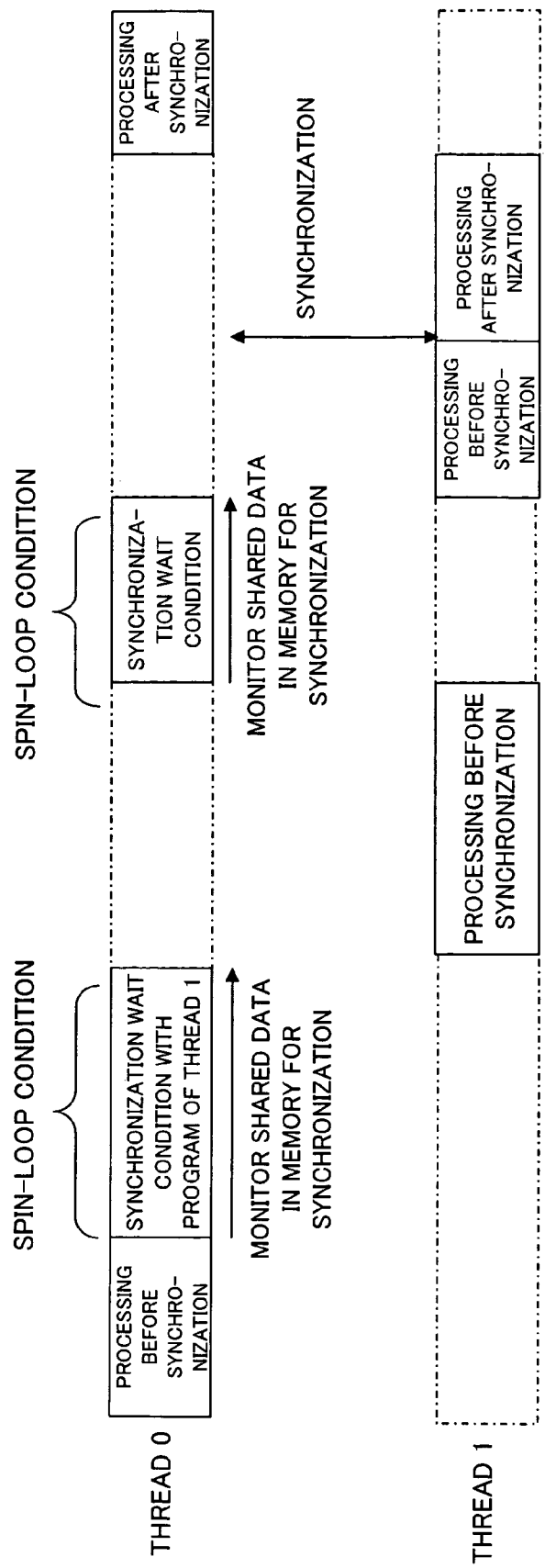
FIG. 19 is an illustration of a state of a spin-loop in a multithread processor.

FIG. 12 is an illustration of an example of the thread switching made whenever a spin-loop is detected between a plurality of (two in FIG. 12) threads 0 and 1 in the processor system according to the embodiment of the present invention.

As shown in FIG. 12, in the vertical multithreading in which the thread switching is made with a cache miss or the elapse of a given period of time being used as a trigger, the so-called spin-loop or self-loop is detected through the use of hardware to, when the spin-loop or self-loop is detected, carry out the thread switching control so that, in particular, the loop in which the processing on the program does not advance is detected through the hardware and the switching to the other thread is made, which prevents the program from interfering with the execution of the other threads in the wait condition without retouching the software, thereby enhancing the processing efficiency of the multithread processor.

In addition, since the function to detect the loop state and the function to making an indication request to the multithread control unit 11 are realized through the use of hardware, the existing programs (threads, software) in the processor system can be mounted without requiring the edition, processing, recompile and others, and great convenience is obtainable.

That is, since the thread switching is made when an instruction string loop is detected, the delay of the processing stemming from the loop is reducible, and the processing in the processor can efficiently be allocated to a plurality of threads to enhance the processing speed, and since it is realizable through hardware, there is no need to retouch the software, which enables the effective use of the existing software resources and leads to an economical system. Moreover, the application to the existing processor system becomes feasible, which provides great convenience.

It should be understood that the present invention is not limited to the above-described embodiment, and that it is intended to cover all changes and modifications of the embodiment of the invention herein which do not constitute departures from the spirit and scope of the invention.

For example, although in the above-described embodiment a multithread processor capable of executing a plurality of threads (programs) in parallel through the use of one or more execution units (arithmetic units) 150 is employed as a CPU (processor system) 1 and, when the thread switching is made in this multithread processor, the spin-loop or self-loop which occurs due to the monitoring on shared data (monitored data) to be used for the synchronization is detected through the use of a loop detecting unit, the present invention is not limited to this. For example, it is also appropriate to conduct similar processing on the spin-loop or self-loop which occurs due to the monitoring on shared data (monitored data) to be used for the synchronization in processing among a plurality of processors in a multiprocessor. Moreover, in a case in which a plurality of processing is conducted in parallel, it is also applicable to the spin-loop or self-loop used for the synchronization among these plurality of processing.

The present invention is applicable not only to a multithread processor but also to, for example, various types of processor systems made to carry out a plurality of processing in parallel, such as switching a CPU at the detection of a spin-loop or self-loop to be used for the synchronization among a plurality of CPUs in a multiprocessor, which achieves efficient switching between these plurality of processing.

What is claimed is:

1. A processor system made to carry out a plurality of threads, each having one or more instructions, in parallel through the use of one or more arithmetic units, comprising:
   a multithread control unit to selectively switch among said threads to be executed in said one or more arithmetic units;
   a loop predicting unit to predict a loop of an instruction string on the basis of a processing history of a branch instruction in said thread; and
   a loop detecting unit to detect, when said loop predicting unit predicts said loop, a fixed-point-mode load instruction for writing data in a fixed-point register in said instruction string, and to detect an occurrence of said loop by detecting a spin-loop when the number of times of continuous occurrence of the same fixed-point-mode load instruction, which is in a continuing condition, exceeds a predetermined value, when said loop detecting unit detects said loop, said multithread control unit switching from said thread, which is in execution in said arithmetic unit, to a different thread.

2. The processor system according to claim 1, wherein said loop predicting unit includes:
   a branch history information storing unit to store processing history of a branch instruction in said thread as branch history information;
   a branch predicting unit to predict said branch instruction on the basis of said branch history information stored in said branch history information storing unit; and
   a prediction evaluating unit to make an evaluation whether or not the prediction on said branch instruction made in said branch predicting unit hits, the prediction on said loop being made when an evaluation result in said prediction evaluating unit shows that the prediction on said branch instruction continuously hits a predetermined number of times or more.

3. The processor system according to claim 2, wherein said branch history information storing unit and said branch predicting unit are provided in an instruction fetching unit which fetches said instruction.

4. The processor system according to claims 1, wherein said loop detecting unit is provided in an instruction decoding unit made to decode said instruction into an executable condition in said arithmetic unit.

5. The processor system according to claim 2, wherein said loop detecting unit detects a fixed-point-mode load instruction for writing data in a fixed-point register in said instruction string to detect the occurrence of a spin-loop on the basis of said fixed-point-mode load instruction.

6. The processor system according to claim 3, wherein said loop detecting unit detects a fixed-point-mode load instruction for writing data in a fixed-point register in said instruction string to detect the occurrence of a spin-loop on the basis of said fixed-point-mode load instruction.

7. The processor system according to claim 1, wherein said loop detecting unit includes a counter to count the number of times of continuous occurrence of the same fixed-point-mode load instruction in said instruction string, which is in a continuing condition, to detect said spin-loop when a value of said counter exceeds a predetermined value.

8. The processor system according to claim 5, wherein said loop detecting unit includes a counter to count the number of times of continuous occurrence of the same fixed-point-mode load instruction in said instruction string, which is in a continuing condition, to detect said spin-loop when a value of said counter exceeds a predetermined value.

9. The processor system according to claim 6, wherein said loop detecting unit includes a counter to count the number of times of continuous occurrence of the same fixed-point-mode load instruction in said instruction string, which is in a continuing condition, to detect said spin-loop when a value of said counter exceeds a predetermined value.

10. The processor system according to claim 7, wherein said loop detecting unit resets said counter when said load instruction detected formerly and said load instruction detected latterly are different from each other.

11. The processor system according to claim 8, wherein said loop detecting unit resets said counter when said load instruction detected formerly and said load instruction detected latterly are different from each other.

12. The processor system according to claim 9, wherein said loop detecting unit resets said counter when said load instruction detected formerly and said load instruction detected latterly are different from each other.

13. The processor system according to claim 7, wherein said loop detecting unit monitors update writing of the detected fixed-point-mode load instruction in an address production register to be used for a memory address production and, when detecting the writing in said address production register, resets said counter.

14. The processor system according to claim 8, wherein said loop detecting unit monitors update writing of the detected fixed-point-mode load instruction in an address production register to be used for a memory address production and, when detecting the writing in said address production register, resets said counter.

15. The processor system according to claim 9, wherein said loop detecting unit monitors update writing of the detected fixed-point-mode load instruction in an address production register to be used for a memory address production and, when detecting the writing in said address production register, resets said counter.

16. The processor system according to claim 7, wherein said loop detecting unit monitors whether or not a store instruction exists in said instruction string and, when detecting said store instruction, resets said counter.

17. The processor system according to claim 8, wherein said loop detecting unit monitors whether or not a store instruction exists in said instruction string and, when detecting said store instruction, resets said counter.

18. The processor system according to claim 9, wherein said loop detecting unit monitors whether or not a store instruction exists in said instruction string and, when detecting said store instruction, resets said counter.

19. The processor system according to claim 1, wherein, when
detecting, in said instruction string, a relative branch instruction in which a target address of said branch instruction is indicative of its own address, said loop detecting unit detects an occurrence of said loop.

20. A thread switching control method for use in a processor system made to carry out a plurality of threads, each having one or more instructions, in parallel through the use of one or more arithmetic units, comprising:
predicting step of predicting a loop of an instruction string on the basis of a processing history of a branch instruction in said thread;
detecting, when said loop is predicted, a fixed-point-mode load instruction for writing data in a fixed-point register in said instruction string, and detecting an occurrence of said loop by detecting a spin-loop when the number of times of continuous occurrence of the same fixed-point-mode load instruction, which is in a continuing condition, exceeds a predetermined value; and
switching, when said spin-loop is detected, from said thread which is in execution in said one or more arithmetic units to a different thread.

21. The thread switching control method according to claim 20, wherein, in said detecting, said loop is detected when a relative branch instruction in which a target address of said branch instruction is indicative of its own address is detected in said instruction string.

22. The thread switching control method according to claim 20, wherein said predicting includes:
storing step of storing a processing history of said branch instruction in said thread as branch history information;
making a prediction on said branch instruction on the basis of said stored branch history information; and
evaluating whether or not said prediction on said branch instruction hits,
said prediction on said loop being made when an evaluation result in said prediction shows that said prediction on said branch instruction continuously hits a predetermined number of times or more.

23. The thread switching control method according to claim 20, wherein, in said detecting, said fixed-point-mode load instruction for writing data in a fixed-point register in said instruction string is detected to detect the occurrence of a spin-loop on the basis of said fixed-point-mode load instruction.

24. The thread switching control method according to claim 20, wherein, in said detecting, said spin-loop is detected when a value of a counter, which counts the number of times of continuous occurrence of the same fixed-point-mode load instruction in said instruction string which is in a continuous condition, exceeds a predetermined value.

25. The thread switching control method according to claim 23, wherein, in said detecting, said spin-loop is detected when a value of a counter, which counts the number of times of continuous occurrence of the same fixed-point-mode load instruction in said instruction string which is in a continuous condition, exceeds a predetermined value.

26. The thread switching control method according to claim 24, wherein, in said detecting, said counter is reset when said load instruction detected formerly and said load instruction detected latterly are different from each other.

27. The thread switching control method according to claim 25, wherein, in said detecting, said counter is reset when said load instruction detected formerly and said load instruction detected latterly are different from each other.

28. The thread switching control method according to claim 24, wherein, in said detecting, update writing of the detected fixed-point-mode load instruction in an address production register to be used for a memory address production is monitored and said counter is reset when the writing in said address production register is detected.

29. The thread switching control method according to claim 25, wherein, in said detecting, update writing of the detected fixed-point-mode load instruction in an address production register to be used for a memory address production is monitored and said counter is reset when the writing in said address production register is detected.

30. The thread switching control method according to claim 24, wherein, in said detecting, a detection is made as to whether or not a store instruction exists in said instruction string and said counter is reset when said store instruction is detected.

31. The thread switching control method according to claim 25, wherein, in said detecting, a detection is made as to whether or not a store instruction exists in said instruction string and said counter is reset when said store instruction is detected.

* * * * *

UNITED STATES PATENT AND TRADEMARK OFFICE
CERTIFICATE OF CORRECTION

| | |
|---|---|
| PATENT NO. | : 7,165,254 B2 |
| APPLICATION NO. | : 10/990385 |
| DATED | : January 16, 2007 |
| INVENTOR(S) | : Toshio Yoshida |

It is certified that error appears in the above-identified patent and that said Letters Patent is hereby corrected as shown below:

Col. 16, line 15, after "predicting" delete "step of predicting".

Col. 16, line 35, after "storing" delete "step of storing".

Signed and Sealed this

Tenth Day of April, 2007

JON W. DUDAS
*Director of the United States Patent and Trademark Office*